United States Patent [19]
Nakata

[11] 3,898,367
[45] Aug. 5, 1975

[54] PARTICLE TRAP FOR COMPRESSED-GAS INSULATED HIGH VOLTAGE BUS

[75] Inventor: Roy Nakata, Pittsfield, Mass.

[73] Assignee: General Electric Company, Philadelphia, Pa.

[22] Filed: Nov. 26, 1974

[21] Appl. No.: 527,381

[52] U.S. Cl. .................. 174/14 R; 174/28; 174/99 B
[51] Int. Cl. ............................................... H01b 9/04
[58] Field of Search ............ 174/14 R, 28, 29, 16 B, 174/99 B, 88 B, 21 C

[56] References Cited
UNITED STATES PATENTS

| | | | |
|---|---|---|---|
| 3,515,939 | 6/1970 | Trump | 174/14 R |
| 3,639,671 | 2/1972 | Clark | 174/14 R |
| 3,767,837 | 10/1973 | Graybill | 174/27 |
| 3,792,188 | 2/1974 | Cronin | 174/14 R X |
| 3,813,475 | 5/1974 | Cronin | 174/28 X |
| 3,856,978 | 12/1974 | Sletten | 174/28 X |

Primary Examiner—Arthur T. Grimley
Attorney, Agent, or Firm—J. Wesley Haubner; William Freedman

[57] ABSTRACT

A compressed-gas insulated high voltage bus is provided with a tubular sheet-metal liner that borders the grounded sheath of the bus and is located between two of the longitudinally spaced insulators of the bus. The tubular liner has a longitudinally extending gap therein and comprises a pair of spaced-apart flanges bordering the gap and extending transversely of the circumference of the liner to form a particle-trapping channel in the gap region. The liner, which is easily insertable into the sheath, has a tendency to expand in diameter thereby gripping the internal wall of the sheath.

6 Claims, 3 Drawing Figures

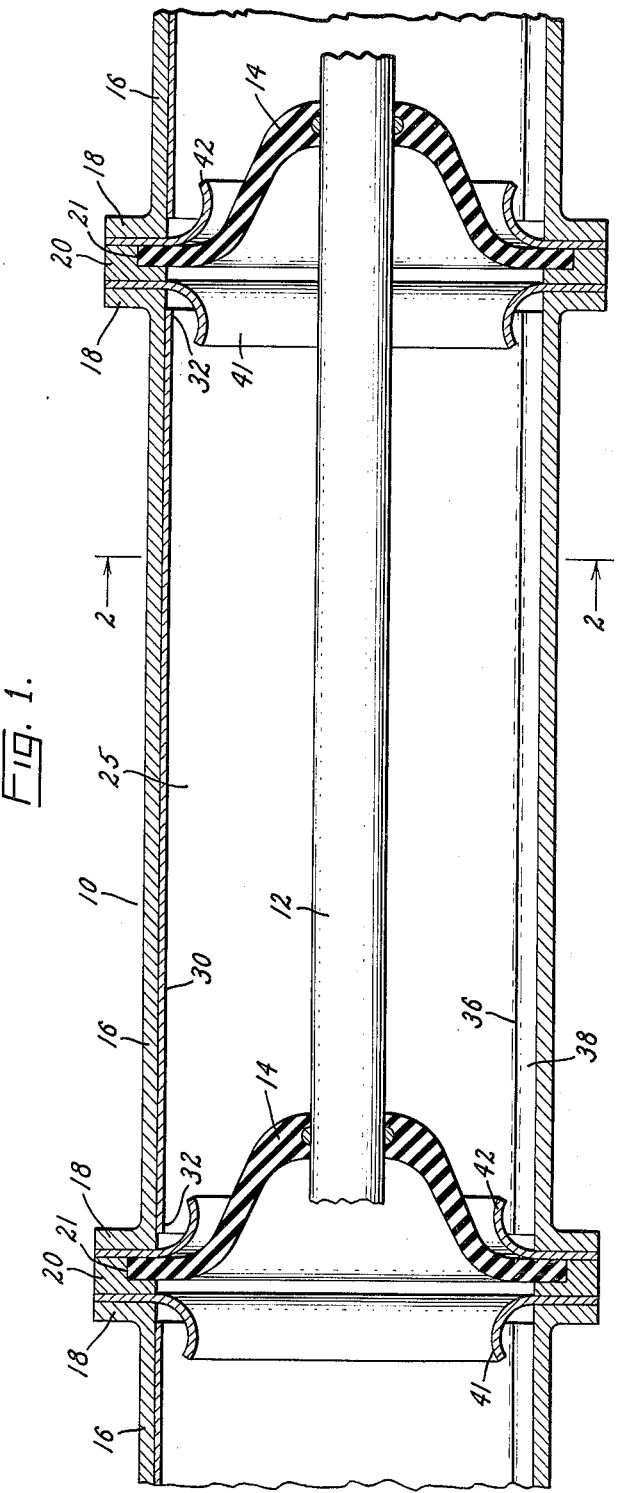
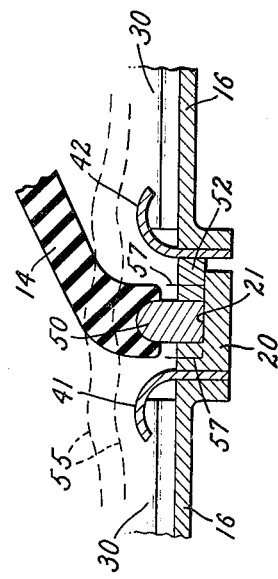
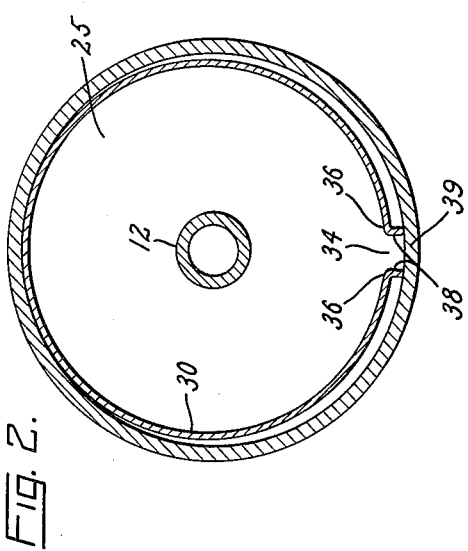

ially of sheath 10 and is supported in this coaxial position by a plurality of insulators 14 at spaced apart locations along the length of conductor 12.

PARTICLE TRAP FOR COMPRESSED-GAS INSULATED HIGH VOLTAGE BUS

BACKGROUND

This invention relates to a compressed-gas insulated high voltage bus and, more particularly, to particle trapping means for such a bus that is operable to extract loose solid particles from the compressed gas to prevent impairment of the bus's dielectric strength by such particles.

The following references are of interest with respect to this invention: U.S. Pat. Nos. 3,324,272-Shankle et al.; 3,378,731-Whitehead; 3,515,939-Trump; 3,792,188-Cronin; 3,813,475-Cronin; and 3,809,795-Olsen et al. Also of interest is the paper by Cronin et al., Optimization of Insulators for Gas Insulated Systems, IEEE Transactions on Power Apparatus and Systems, Vol. PAS 92, No. 2, March/April 1973, pages 558–564.

The bus that I am concerned with comprises a grounded metal sheath, a high voltage conductor within the sheath, insulators maintaining the conductor spaced from the sheath, and compressed gas between the conductor and the sheath for the purpose of maintaining a high dielectric strength therebetween. It has been recognized heretofore that loose solid particles in the compressed gas can impair its dielectric strength and also the dielectric strength along the surface of the insulators.

As will be apparent from the references referred to hereinabove, a number of different techniques have been proposed for extracting and trapping these loose particles. One of the techniques proposed by Trump in U.S. Pat. No. 3,515,939 is to form a longitudinally extending slot in the grounded outer sheath. This slot provides a region of low density electric field adjacent the inner wall of the sheath into which the solid particles are attracted. This slot is formed by deforming a portion of the sheath wall to produce the desired slot configuration. A disadvantage of this particle trap is that it is comparatively expensive to provide since it requires the use of special and expensive fabrication techniques for the sheath. Another disadvantage is that the irregular shape of the sheath complicates the design of any couplings or joints used for joining adjacent sheath sections. Still another disadvantage is that this particle trap cannot readily be incorporated into an existing bus design without replacement of the sheath, which, of course, is expensive.

SUMMARY

An object of my invention is to provide a particle trap of the type which comprises a longitudinal slot adjacent the inner surface of the sheath but yet is relatively inexpensive and can readily be installed in an existing bus without necessitating replacement of the sheath.

It has also been proposed heretofore to provide a particle trap by attaching a metal screen to the inner surface of the grounded sheath in such a way that there is a space between the screen and the sheath that is in a region of low density electric field. A disadvantage of this approach is that fastening means are required for attaching such screens to the sheath, and these fastening means often introduce electrical stress concentrations thereadjacent that can be a source of dielectric weakness. Also, in the region where the screen approaches the sheath, the space between the sheath and the screen is very shallow and particles can become lodged therein with portions thereof projecting through the screen. This results in sharp projections on the highly stressed inner surface of the screen, which can be a source of dielectric weakness.

Another object of my invention is to provide for a high voltage compressed-gas insulated bus a particle trap that can be installed without the aid of screws and similar fasteners and which has no shallow spaces in which particles can lodge and project into the highly stressed region of the bus.

In carrying out my invention in one form I provide a bus that comprises a cylindrical sheath of conductive material normally at ground potential, a conductor within the sheath normally at a relatively high potential with respect to the sheath, and insulating structures within the sheath at a pair of spaced-apart locations along the length of the conductor for mounting the conductor in radially spaced relationship to the sheath. I provide the sheath with a sheet metal liner having a generally tubular configuration, longitudinally spaced-apart ends, and a gap extending longitudinally of the liner between said ends. The liner borders the internal surface of the sheath and is located between said spaced-apart insulating structures with its ends adjacent to but spaced from the insulating structures. The liner comprises circumferentially extending wall portions immediately adjacent said gap and a pair of spaced-apart flanges bordering the gap along the gap length and extending transversely of the circumferentially extending wall portions between the circumferentially extending wall portions and the internal surface of the sheath. The flanges and the sheath portion spanning the gap define a particle-trapping channel extending longitudinally of the sheath in a region of low density electric field. The liner has a tendency to expand in diameter, thereby gripping the internal wall of the sheath.

BRIEF DESCRIPTION OF DRAWINGS

For a better understanding of the invention, reference may be had to the following description taken in conjunction with the accompanying drawing, wherein:

FIG. 1 is a cross sectional view of a compressed-gas insulated high voltage bus embodying one form of the invention.

FIG. 2 is a cross sectional view taken along the line 2—2 of FIG. 1.

FIG. 3 is a cross sectional view of a modified form of the invention taken in a sectional plane similar to that used for FIG. 1.

DETAILED DESCRIPTION OF PREFERRED EMBODIMENTS

Referring now to FIG. 1, the illustrated bus comprises a tubular metal sheath 10 at ground potential and a rigid conductor 12 normally at a high potential with respect to the sheath. Conductor 12 is positioned coaxially of sheath 10 and is supported in this coaxial position by a plurality of insulators 14 at spaced apart locations along the length of conductor 12.

Sheath 10 is made up of a plurality of sections 16 connected together in end-to-end relationship. Each of these sections has integral end flanges 18 that are suitably secured to the juxtaposed end flanges on immediately adjacent sheath sections, as will soon be described in more detail.

The insulators 14 are of a conventional cone type, each having a central bore through which conductor 12 extends and an annular outer peripheral portion that is suitably joined to the sheath 10. In the illustrated embodiment, an annular metallic support ring 20 is positioned about the outermost periphery of each insulator 14, and this support ring and the outer periphery of the insulator are clamped between a pair of juxtaposed end flanges 18. Suitable studs (not shown) extending through aligned holes in parts 18 and 20 are provided for clamping these parts together. Suitable gaskets or seals are provided in this joint to render it leak-tight. In this embodiment, an annular notch 21 in the support ring 20 directly receives the outer periphery of insulator 14.

For maintaining a high dielectric strength between the high voltage conductor 12 and the grounded sheath 10, the space therebetween is filled with a high dielectric-strength, pressurized gas 25, such as sulfur hexafluoride. It has been recognized heretofore that loose solid particles in the compressed gas can impair its dielectric strength and also the dielectric strength along the surface of the insulators 14. Although great care is normally taken to exclude such particles from the gas, at least some such particles will nearly always be present.

Unless suitably controlled, these loose particles will dance rapidly back and forth between the conductor 12 and the sheath 10, producing corona and other types of electrical discharge that can impair the dielectric strength between conductor 12 and sheath 10. For a more detailed description of this phenomena, reference may be had to a paper by Diessner and Trump, Free Conducting Particles in a Coaxial Compressed-Gas Insulated System, IEEE Transactions on Power Apparatus and Systems, Vol. PAS-89, No. 8, November/December 1970, pages 1970-1978.

For trapping the above-described particles and thus reducing the chances of dielectric impairment, I provide within each tubular section 16 a sheet metal liner 30 also having a generally tubular configuration. This liner has longitudinally spaced-apart ends 32 and a gap 34 (shown in FIG. 2) extending longitudinally of the liner between the ends 32. Liner 30 borders the internal surface of the sheath section 16 and is located between the insulators 14 with its ends 32 adjacent to but spaced from the insulators.

Liner 30 comprises circumferentially extending wall portions 36 immediately adjacent the gap 34 and a pair of spaced-apart flanges 38 bordering the gap along the gap length and extending transversely of the circumferentially extending wall portions 36 between said portions 36 and the internal surface of the sheath. The spaced flanges 38 together with the sheath portion 39 that spans the gap 34 between the flanges 38 define a particle-trapping channel 38, 39 extending longitudinally of the sheath.

Since the metal liner 30 contacts the sheath and is therefore at the same potential as the sheath, it will be apparent that the space within the narrow channel 38, 39 is a region of very low density electric field. Loose particles from the dielectric gas 25 will be attracted into this space within the channel 38, 39 and there held immobile, or trapped, thus reducing the likelihood that they will impair the dielectric strength of the gas 25.

The liner 30 is a resilient member which has a tendency to expand in diameter. It thus expands into contact with the internal surface of the sheath, in effect, gripping the sheath and holding itself generally stationary with respect to the sheath. No auxiliary fasteners are required to maintain the liner generally stationary with respect to the sheath. Except for the gap 34, the liner 30 is substantially imperforate. Thus, there is little likelihood that particles will enter the space the liner 30 and the sheath and substantially no chance for any particles which might possibly enter this space to project through openings in the liner into the highly stressed region at the inner surface of the liner. As pointed out hereinabove, such projecting particles can be a source of dielectric weakness, and their avoidance is a distinct advantage over screen-type arrangements where such particles could be present.

It will be apparent that a bus which has no particle trap can easily be modified by the addition of my liners 30 in each sheath section 16 to provide each sheath section with a particle trap. All that is required is that the liner 30 be slipped into each sheath section during assembly of the bus before the second insulator 14 is clamped in place. No additional fastening means is needed to secure the liner. The particle trap should be located at the bottom of the sheath so that particles do not fall out of the trap by gravity when the bus is deenergized, and care should thus be taken to assure that the liner 30 is suitably positioned circumferentially with respect to the sheath so as to locate the flanges 38 at the bottom of the sheath.

In a bus without the liner 30, it is desirable to provide each insulator with shields that reduce the chances that loose particles moving along the inner surface of the sheath 10 or the outer surface of the conductor 12 will find their way onto the surfaces of insulator 14. For discouraging such particle transfer onto the insulator surfaces, metal shielding rings are provided adjacent the junction of the insulator with the sheath and adjacent the junction of the insulator with the high voltage conductor. Shields of this nature are shown at 41 and 42 in FIG. 1 adjacent the outer periphery of the insulator 14. Similar shields are located adjacent the inner periphery of the insulator but have been omitted in the drawing for simplification. Each of the shields 41 and 42 is a metal ring, flat near its outer periphery but flared into a rounded shape near its inner periphery. The flattened portion of each shielding ring is clamped between the flanges 18 of the adjacent sheath sections. The rounded inner portion of each ring projects slightly away from the insulator body and into the adjacent sheath section 16.

Even though the liner 30 provides particle trapping means, I retain the shielding rings 41 and 42 not only to perform their previously intended function but also to electrostatically shield the ends 32 of the liner. Since these shielding rings are in contact with the sheath sections 16 they are at ground potential. Since the flared inner end of each shielding ring extends into the bore of the adjacent liner 30 so that the ends 32 are surrounded by metal at ground potential, the shielding ring provides an electrostatic shield around the adjacent end of the liner, locating the end 32 of the liner in a region of very low density electric field. This reduces the chances of a sparkover being initiated from the end of the liner.

In the embodiment shown in FIG. 3, I construct the bus in such a manner that the region between immediately adjacent shielding rings 41 and 42 also acts as a particle trap. In this regard, the insulator 14 is modified so that its circumference is spaced radially inwardly from the support ring 20. Imbedded in the outer periphery of the insulator is a metal grading ring 50 that extends radially outward into the notch 21 in the surrounding support ring 20. A portion of the surrounding support ring 20 is disposed at one side of the grading ring 50, and a spacer ring 52 is disposed at the other side of the grading ring, thus locating the grading ring 50 in a position spaced from both shielding rings 41 and 42, considered longitudinally of the bus.

The depicted construction results in low intensity equipotential wells being present between the shielding rings 41 and 42 at either side of the grading ring 50, as evidenced by the shape of the equipotential lines 55 shown in this region. Thus, particles that find their way into this region are captured and restrained against levitating into the higher stress region further radial inward.

The particle trap depicted in FIG. 3 is more effective in retaining particles if the grading ring 50 is exposed, as shown, in the region between the insulator 14 and the surrounding sheath; but in some applications, it is satisfactory if the insulation of insulator 14 extends radially outward to the sheath and covers the lateral faces of the grading ring 50, as shown by dotted lines 57. The low density field regions are still present immediately adjacent the sheath in the same regions as depicted in FIG. 3.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. A compressed-gas insulated high voltage bus comprising:
   a. a cylindrical sheath of conductive material normally at ground potential,
   b. a conductor within said sheath normally at a relatively high potential with respect to said sheath,
   c. insulating structures within said sheath at a pair of spaced-apart locations along the length of said conductor for mounting said conductor in radially spaced relationship to said sheath,
   d. a sheet metal liner for said sheath having a generally tubular configuration, longitudinally spaced-apart ends, and a gap extending longitudinally of said liner between said ends,
   e. said liner bordering the internal surface of said sheath and located between said spaced-apart insulating structures with said ends adjacent to but spaced from said insulating structures,
   f. said liner comprising circumferentially extending wall portions immediately adjacent said gap and a pair of spaced-apart flanges bordering said gap along the gap length and extending transversely of said circumferentially extending wall portions between said circumferentially extending wall portions and said internal surface of the sheath, said flanges and the sheath portion spanning said gap defining a particle-trapping channel extending longitudinally of said sheath and in a region of low density electric field,
   g. said liner having a tendency to expand in diameter thereby gripping the internal wall of said sheath.

2. The structure of claim 1 in combination with:
   a. conductive shielding of annular configuration mounted on said sheath and extending radially inward therefrom adjacent one of said insulating structures,
   b. said shielding being located between an end of said liner and the insulating structure thereadjacent and having a rounded portion that generally overlaps said end and provides an electrostatic about said end.

3. The structure of claim 1 in combination with:
   a. an additional sheet metal liner of tubular configuration mounted within said sheath in bordering relationship to the internal surface of said sheath in a position spaced longitudinally of said bus from the first of said liners, one of said insulating structures being of annular form and located between the ends of said liners in a position adjacent said ends but spaced therefrom,
   b. conductive shielding structures of annular configuration mounted on said sheath and extending radially inward therefrom adjacent said one insulating structure,
   c. said shielding structures being located between the respective ends of said liners and said one insulating structure, each shielding structure having a rounded portion that generally overlaps the associated liner end and provides an electrostatic shield about said associated end.

4. The structure of claim 1 in which:
   a. at least one of said insulating structures comprises a disc of insulating material surrounding said conductor and having its outer periphery spaced radially inward from said cylindrical sheath,
   b. a metallic grading ring surrounds said outer periphery and extends radially outward to the sheath,
   c. conductive shielding structures of annular configuration are mounted on said sheath at opposite sides of said grading ring in positions spaced longitudinally of said bus from said grading ring to provide generally annular wells of low density electric field between said shielding structures at opposite sides of said grading ring,
   d. one of said shielding structures is located between an end of said liner and the insulating disc threadjacent, and
   e. said one shielding structure has a rounded portion that generally overlaps the adjacent end of said liner and provides an electrostatic shield about said adjacent end.

5. The structure of claim 4 in which:
   a. an additional sheet metal liner of tubular configuration is mounted within said sheath in bordering relationship to the internal surface of said sheath in a position spaced longitudinally of said bus from the first of said liners,
   b. said one insulating structure is located between the ends of said liners in a position adjacent said ends but spaced therefrom,
   c. the other of said shielding structures is located between the end of said additional liner and said one insulating structure, and
   d. said other shielding structure has a rounded portion that generally overlaps the adjacent end of said additional liner and provides an electrostatic shield about said adjacent end of said additional liner.

6. The structure of claim 1 in which:
a. at least one of said insulating structures comprises a disc of insulating material surrounding said conductor and having a metallic grading ring at its outer periphery extending radially outward to said sheath,
b. conductive shielding structures of annular configuration are mounted on said sheath at opposite sides of said grading ring in positions spaced longitudinally of said bus from said grading ring to provide between said shielding structures at opposite sides of said grading ring generally annular wells of low density electric field into which loose particles are attracted,
c. one of said shielding structures is located between one end of said liner and the insulating disc thereadjacent, and
d. said one shielding structure has a rounded portion that generally overlaps the adjacent end of said liner and provides an electrostatic shield about said end.

* * * * *